United States Patent
Chang et al.

(10) Patent No.: US 10,508,935 B2
(45) Date of Patent: Dec. 17, 2019

(54) OPTICAL MODULE AND MANUFACTURING PROCESS THEREOF

(71) Applicant: ADVANCED SEMICONDUCTOR ENGINEERING, INC., Kaohsiung (TW)

(72) Inventors: Yung-Yi Chang, Kaohsiung (TW); Ying-Chung Chen, Kaohsiung (TW)

(73) Assignee: ADVANCED SEMICONDUCTOR ENGINEERING, INC., Kaosiung (TW)

( * ) Notice: Subject to any disclaimer, the term of this patent is extended or adjusted under 35 U.S.C. 154(b) by 475 days.

(21) Appl. No.: 14/884,065

(22) Filed: Oct. 15, 2015

(65) Prior Publication Data

US 2017/0108357 A1    Apr. 20, 2017

(51) Int. Cl.
*G01D 5/34*    (2006.01)

(52) U.S. Cl.
CPC ...................... *G01D 5/34* (2013.01)

(58) Field of Classification Search
CPC ........... G01D 5/34; G01S 17/00; G01S 17/02; G01S 17/026; G01S 7/00; G01S 7/48; G01S 7/481; G01S 7/4811; G01S 7/4813; G06F 1/3231; H03K 17/94; H03K 17/941; H03K 17/943; H03K 17/945; H03K 2217/941; H03K 2217/945; H03K 2217/94111; H03K 2217/94112; H03K 2217/94108; H03K 2017/9455; H01L 25/167; H01L 31/167; H01L 31/173
See application file for complete search history.

(56) References Cited

U.S. PATENT DOCUMENTS

| | | | |
|---|---|---|---|
| 6,335,548 B1* | 1/2002 | Roberts | H01L 23/49562 250/239 |
| 7,317,183 B2* | 1/2008 | Wong | G01D 5/34707 250/231.13 |
| 8,957,380 B2* | 2/2015 | Costello | G01S 7/4813 250/338.1 |
| 9,269,848 B2 | 2/2016 | Lermer et al. | |

(Continued)

FOREIGN PATENT DOCUMENTS

| | | |
|---|---|---|
| CN | 2476101 Y | 2/2002 |
| CN | 2484636 Y | 4/2002 |

(Continued)

OTHER PUBLICATIONS

Office Action for corresponding Chinese Patent Application No. 201610897499.X, dated Aug. 29, 2019, 10 pages.

(Continued)

*Primary Examiner* — John R Lee
(74) *Attorney, Agent, or Firm* — Foley & Lardner LLP; Cliff Z. Liu

(57) ABSTRACT

The present disclosure provides an optical module and a manufacturing process thereof. The optical module includes a carrier, a light source, a light detector, a molding compound and a lid. The light source is disposed adjacent to a surface of the carrier. The light detector is disposed adjacent to the surface of the carrier. The molding compound encapsulates the light source and the light detector, and includes at least one guiding structure. The lid is disposed between the light source and the light detector, and surrounds the light source and the light detector.

22 Claims, 4 Drawing Sheets

(56) References Cited

U.S. PATENT DOCUMENTS

| | | | |
|---|---|---|---|
| 10,088,356 B2 | 10/2018 | Chu et al. | |
| 10,132,677 B2 | 11/2018 | Chu et al. | |
| 2004/0055155 A1* | 3/2004 | Manansala | G06K 9/0002 29/860 |
| 2006/0016970 A1* | 1/2006 | Nagasaka | G01D 5/305 250/231.13 |
| 2006/0076523 A1* | 4/2006 | Higashiisogawa | G01N 21/4738 250/559.11 |
| 2007/0090282 A1* | 4/2007 | Chin | G01D 5/34715 250/231.13 |
| 2011/0061340 A1* | 3/2011 | Lim | G01D 11/245 53/396 |
| 2011/0204233 A1 | 8/2011 | Costello et al. | |
| 2012/0037793 A1* | 2/2012 | Ong | G02B 3/02 250/216 |
| 2012/0176599 A1* | 7/2012 | Leung | G01N 21/31 356/39 |
| 2012/0290255 A1* | 11/2012 | Kelkar | H01L 25/167 702/150 |
| 2013/0037705 A1* | 2/2013 | Soo | G01D 5/34715 250/231.13 |
| 2013/0050677 A1* | 2/2013 | Kwong | G01S 17/026 356/51 |
| 2013/0292705 A1* | 11/2013 | Makimura | H01L 25/167 257/81 |
| 2014/0042305 A1 | 2/2014 | Liu | |
| 2014/0103199 A1* | 4/2014 | Loong | G01S 17/026 250/214.1 |
| 2014/0175462 A1* | 6/2014 | Lermer | H01L 25/167 257/82 |
| 2014/0299896 A1* | 10/2014 | Xu | H01L 25/0753 257/88 |
| 2015/0028358 A1 | 1/2015 | Tu et al. | |
| 2016/0013223 A1* | 1/2016 | Chang | H01L 31/18 257/432 |
| 2016/0061653 A1* | 3/2016 | Chang | H01L 25/167 250/237 R |
| 2016/0146639 A1* | 5/2016 | Chan | G01S 17/026 250/393 |
| 2016/0178366 A1* | 6/2016 | Chen | G01C 3/08 250/216 |
| 2016/0238443 A1* | 8/2016 | Chu | A61B 5/14552 |
| 2017/0108357 A1* | 4/2017 | Chang | G01D 5/34 |
| 2017/0284864 A1* | 10/2017 | Chen | G01J 1/0204 |

FOREIGN PATENT DOCUMENTS

| | | |
|---|---|---|
| CN | 101179086 A | 5/2008 |
| CN | 103608922 A | 2/2014 |
| CN | 104952719 A | 9/2015 |
| CN | 105895595 A | 8/2016 |
| EP | 1 517 372 A2 | 3/2005 |
| TW | M448798 U | 3/2013 |
| TW | 201428982 A | 7/2014 |
| TW | 201505134 A | 2/2015 |
| TW | 201629439 A | 8/2016 |

OTHER PUBLICATIONS

Search Report for corresponding Chinese Patent Application No. 201610897499.X, dated Aug. 29, 2019, 5 pages.

Office Action for corresponding Taiwan Patent Application No. 105130029, dated Oct. 16, 2019, 13 pages.

Search Report for corresponding Taiwan Patent Application No. 105130029, dated Oct. 16, 2019, 2 pages.

* cited by examiner

OPTICAL MODULE AND MANUFACTURING PROCESS THEREOF

BACKGROUND

1. Technical Field

The present disclosure relates to an optical module and a manufacturing process thereof.

2. Description of the Related Art

An optical module, such as a proximity sensor, may be used to detect an object in proximity to the optical module. The optical module may include a light source and an optical detector, where the optical detector can receive or detect a light emitted from the light source and reflected from an object so that the proximity of the object can be detected.

It may be desirable to achieve reductions in dimensions and weight of optical modules. However, such reductions may result in a need for increased precision in manufacturing, which may in turn result in decreased manufacturing yield. Improved manufacturing techniques are desirable to provide for reductions in dimensions and weight of optical modules without decreased manufacturing yield.

SUMMARY

In an aspect, an optical module includes a carrier, a light source, a light detector, a molding compound and a lid. The light source is disposed adjacent to a surface of the carrier. The light detector is disposed adjacent to the surface of the carrier. The molding compound encapsulates the light source and the light detector, and includes at least one guiding structure. The lid is disposed between the light source and the light detector, and surrounds the light source and the light detector.

In an aspect, a process of manufacturing an optical module includes: providing a carrier; disposing at least one light source and at least one light detector adjacent to a surface of the carrier; encapsulating the light source and the light detector by an encapsulant, the encapsulant formed to include at least one guiding structure; and applying a lid surrounding the light source and the light detector, wherein a portion of the lid is positioned between the light source and the light detector.

BRIEF DESCRIPTION OF THE DRAWINGS

Common reference numerals are used throughout the drawings and the detailed description to indicate the same elements. The present disclosure will be more apparent from the following detailed description taken in conjunction with the accompanying drawings.

DETAILED DESCRIPTION

Spatial descriptions, such as "above," "below," "up," "left," "right," "down," "top," "bottom," "vertical," "horizontal," "side," "higher," "lower," "upper," "over," "under," and so forth, are used to describe a certain component or certain plane of a component with respect to the orientation shown in the respective figure(s). It should be understood that the spatial descriptions used herein are for purposes of illustration only, and that practical implementations of the structures described herein can be spatially arranged in any orientation or manner, provided that the merits of embodiments of this disclosure are not deviated by such arrangement.

Described in the present disclosure are improvements to an optical module and techniques for manufacturing the optical module, such that the optical module has reduced dimensions and weight, without reducing manufacturing yield.

Figure 1:
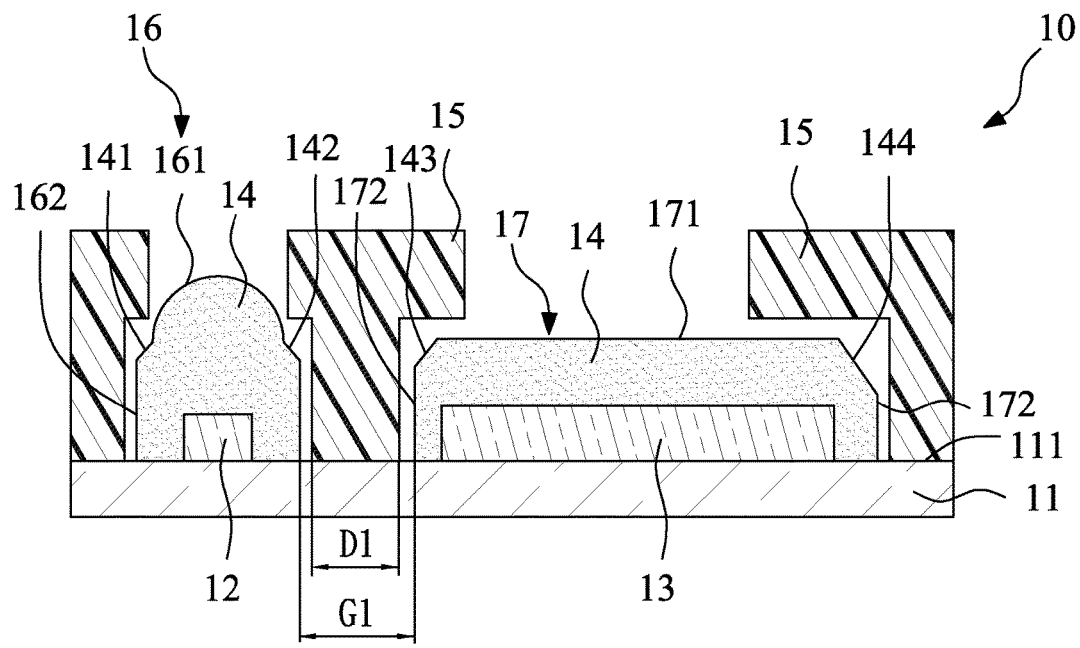
FIG. 1 illustrates a cross-sectional view of an optical module according to an embodiment of the present disclosure.

FIG. 1 illustrates a cross-sectional view of an optical module according to an embodiment of the present disclosure. The optical module 10 includes a carrier 11, a light source 12, a light detector 13, an encapsulant such as molding compound 14, and a lid 15. The carrier 11 includes a surface 111. One or more bonding pads (not shown) may be disposed on, or embedded in, the surface 111. One or more circuits (not shown) may be included on or within the carrier 11, and the circuit(s) may be electrically connected to the bonding pad(s). The carrier 11 can be used for a flip chip type of package arrangement.

The light source 12 is disposed adjacent to the surface 111. The light detector 13 is disposed adjacent to the surface 111. In an embodiment, the light source 12 and the light detector 13 are disposed on the surface 111 of the carrier 11. The light source 12 includes one or more light emitting areas. The light detector 13 may be, for example, one or more photodiodes. In one or more embodiments, the light source 12 is used to emit an infrared (IR) light, and the light detector 13 is used to detect an IR light. In one or more embodiments, the light source 12 is a vertical-cavity surface-emitting laser (VCSEL) or a light emitting diode die (LED die).

The light source 12 and the light detector 13 are electrically connected to the carrier 11. In an embodiment, the light source 12 and the light detector 13 may be electrically connected to the circuits of the carrier 11. For example, the carrier 11 may include a circuit to activate the light source 12 to emit light, and/or may include a circuit to transform an optical signal received by the optical detector 13 to an electrical signal.

The molding compound 14 encapsulates the light source 12 and the light detector 13, and includes one or more guiding structures, such as the guiding structures 141, 142, 143, 144 illustrated in FIG. 1. The molding compound 14 is disposed adjacent to the surface 111 of the carrier 11. In one or more embodiments, the molding compound 14 is, or is partially, a material transparent to the emitted and received light. In one or more embodiments, the molding compound 14 encapsulates the light source 12, the light detector 13, and portions of the surface 111 of the carrier 11. For example, the molding compound 14 may be, or may include, an applied epoxy. The molding compound 14 is useful to protect the components of the optical module 10 without affecting the optical properties of the optical module 10.

A portion of the molding compound 14 encapsulates the light source 12, and the portion of the molding compound 14 with the light source 12 is an encapsulated light source 16. Another portion of the molding compound 14 encapsulates the light detector 13, and the portion of the molding compound 14 with the light detector 13 is an encapsulated light detector 17. The encapsulated light source 16 includes a top surface 161 and a side surface 162, and the encapsulated light detector 17 includes a top surface 171 and a side surface 172. In an embodiment, the top surface 161 of the encapsulated light source 16 has a lens structure for focusing the emitting light, and the top surface 171 of the encapsulated light detector 17 is a substantially horizontal plane (with respect to the orientation shown) substantially parallel with the surface 111 of the carrier 11. The top surface 171 and the side surface 172 of the encapsulated light detector 17 are substantially orthogonal, because the side surface 172 is formed by cutting. A roughness of the top surface 161 of the encapsulated light source 16 is different from (e.g., less than) that of the side surface 162, and a roughness of the top surface 171 of the encapsulated light detector 17 is different from (e.g., less than) that of the side surface 172.

The guiding structures 141, 142 are disposed between the top surface 161 and the side surface 162 of the encapsulated light source 16. The guiding structures 143, 144 are disposed between the top surface 171 and the side surface 172 of the encapsulated light detector 17. In one or more embodiments, the guiding structures 141, 142 on the encapsulated light source 16 are omitted. In one or more embodiments, the guiding structures 143, 144 on the encapsulated light detector 17 are omitted. In an embodiment, the guiding structures 141, 142, 143, 144 are chamferings.

The lid 15 surrounds the light source 12 and the light detector 13, and is further disposed between the light source 12 and the light detector 13. The lid 15 is provided to prevent the light emitted from the light source 12 from directly reaching the light detector 13. The lid 15 may include a hardened liquid crystal polymer. In an embodiment, there is a gap G1 between the encapsulated light source 16 and the encapsulated light detector 17, and a portion of the lid 15 is disposed in the gap G1. To reduce dimensions of the optical module 10, the gap G1 should be small. However, when the gap G1 is small, it may be difficult to dispose the lid in the gap G1, thus a risk of damage to the optical module 10 is increased as a width of the gap G1 decreases. Such risk may be reduced by using the guiding structures 141, 142, 143, 144 such that, as the lid 15 is guided into the gap G1, there is a reduced risk of contact between the lid 15 and the encapsulated light source 16 and the encapsulated light detector 17. Therefore, the size of the optical module 10 can be decreased, and manufacturing yield can be increased. In an embodiment, the gap G1 is about 0.05 millimeter (mm) to about 0.5 mm, and a dimension D1 of the portion of the lid 15 in the gap G1 is about 0.03 mm to about 0.3 mm.

Figure 2:
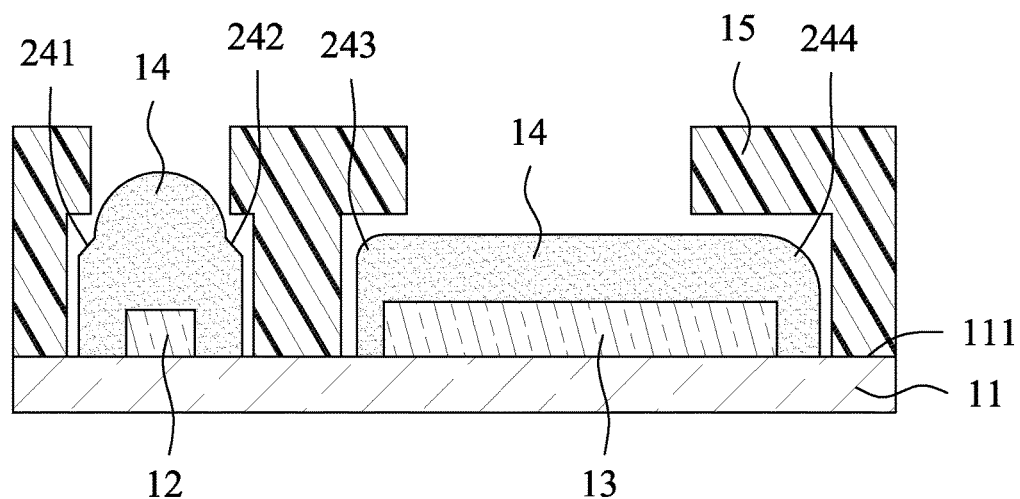
FIG. 2 illustrates a cross-sectional view of an optical module according to an embodiment of the present disclosure.

FIG. 2 illustrates a cross-sectional view of an optical module according to an embodiment of the present disclosure. FIG. 2 is similar to FIG. 1, except that the guiding structures 243, 244 have a substantially rounded or arcuate shape. In one or more embodiments, the guiding structures 241, 242 also have a substantially rounded or arcuate shape.

Figure 3:
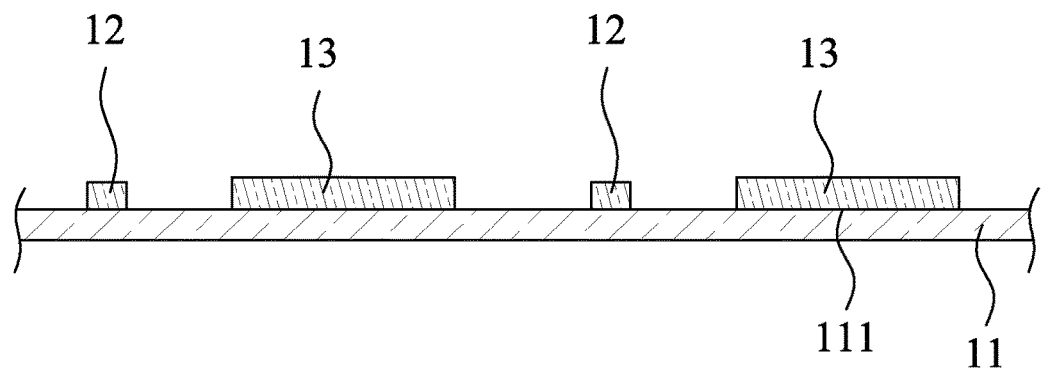
FIG. 3, FIG. 4, FIG. 5, FIG. 6, FIG. 7 and FIG. 8 illustrate a process of manufacturing an optical module according to an embodiment of the present disclosure.

FIGS. 3-8 illustrate a process of manufacturing an optical module according to an embodiment of the present disclosure. Referring to FIG. 3, a carrier 11 is provided. The carrier 11 has a surface 111. The carrier may be a printed circuit board, a substrate, or other carrier. In one or more embodiments, the carrier 11 includes one or more traces, one or more wire-bonding pads, one or more vias, or a combination thereof, which may be positioned on and/or below the surface 111. In one or more embodiments, the carrier 11 includes one of, or a combination of, an organic material, a polymer material, silicon, silicon dioxide, or other silicide.

One or more light sources 12 and one or more light detectors 13 are disposed adjacent to the surface 111 of the carrier 11. In one or more embodiments, the light sources 12 and the light detectors 13 are attached to the carrier 11 by an adhesive, which may be a conductive or a non-conductive adhesive. In one or more embodiments, the light source 12 is a light emitting diode. In one or more embodiments, the light detector 13 is a photodiode.

Figure 4:
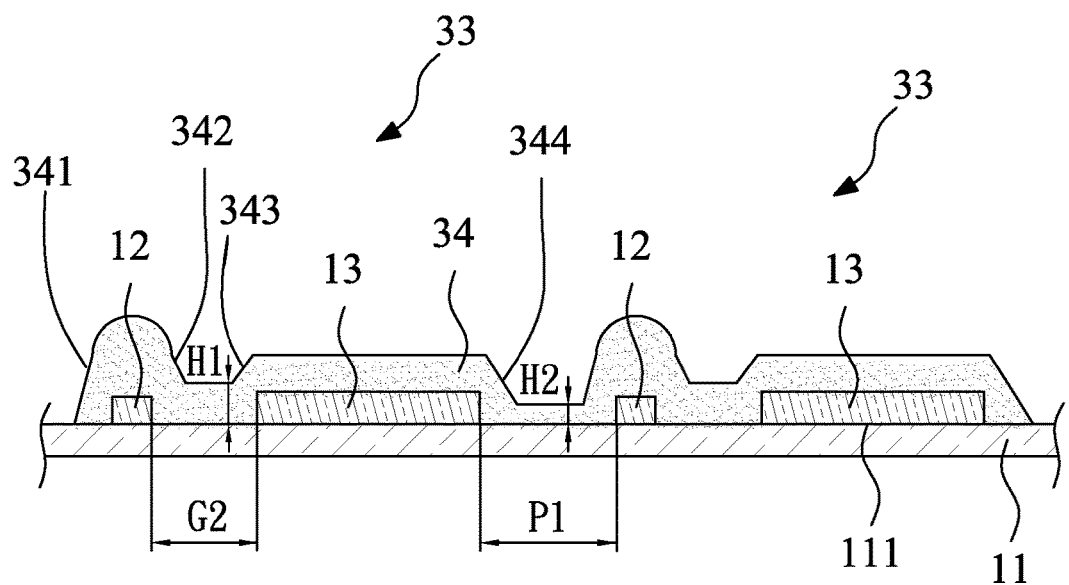

Referring to FIG. 4, an encapsulant such as molding compound 34 is applied to encapsulate the light sources 12 and the light detectors 13. One light source 12 and one adjacent light detector 13 are an optical pair 33; thus, two optical pairs 33 are illustrated in FIG. 4. Within each optical pair 33, there is a gap G2 between the light source 12 and the light detector 13, and the molding compound 34 is disposed within the gap G2. Between adjacent optical pairs 33, there is a connecting portion P1, and the molding compound 34 is further disposed on the connecting portion P1. In an embodiment, a height H1 of the molding compound 34 in the gap G2 is higher than a height H2 of the molding compound 34 on the connecting portion P1.

The molding compound 34 includes at least one guiding structure, such as the guiding structures 341, 342, 343, 344 illustrated in FIG. 4, which may be formed using a mold. The guiding structures 341, 342, 343, 344 are disposed above the gap G2 and the connecting portion P1. In the embodiment illustrated in FIG. 4, the guiding structures 341, 342, 343, 344 are sloped surfaces.

Figure 5:
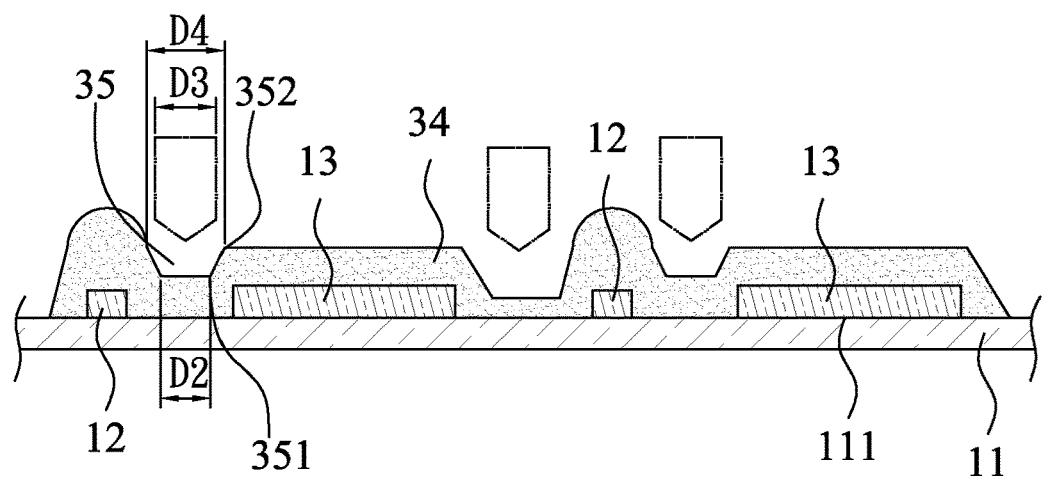
Figure 6:
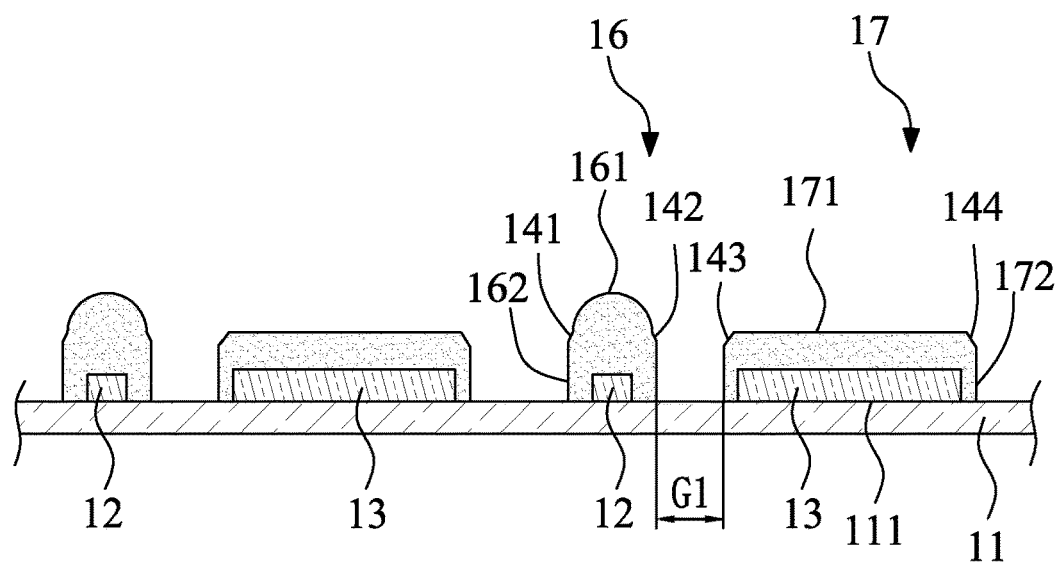

Referring to FIGS. 5 and 6, a cutting device (illustrated in dotted line) is used to cut part of the molding compound 34 in the gap G1 and part of the molding compound 34 on the connecting portion P1.

As illustrated in FIG. 5, a surface of the molding compound 34 in the gap G1 forms a first recess 35. A dimension on a bottom 351 of the first recess 35 is D2, and a dimension on an outer periphery 352 of the first recess 35 is D4. A dimension of the cutting device is D3. In an embodiment, D4 is larger than D3, and D3 is larger than D2.

Referring to FIG. 6, parts of the molding compound 34 are removed (by the cutting device as illustrated in FIG. 5) to form encapsulated light sources 16 and encapsulated light detectors 17, and a portion of the surface 111 of the carrier 11 is exposed. The encapsulated light source 16 includes a top surface 161 and a side surface 162, and the encapsulated light detector 17 includes a top surface 171 and a side surface 172. In an embodiment, the top surface 161 of the encapsulated light source 16 has a lens structure for focusing emitted light, and the top surface 171 of the encapsulated light detector 17 is a substantially horizontal plane (with respect to the orientation shown), substantially parallel with the surface 111 of the carrier 11. The top surface 171 and the side surface 172 of the encapsulated light detector 17 are substantially orthogonal because the side surface 172 is formed by cutting. A roughness of the top surface 161 is different from that of the side surface 162, and a roughness of the top surface 171 is different from that of the side surface 172.

The guiding structures 141, 142 are disposed between the top surface 161 and the side surface 162 of the encapsulated light source 16. The guiding structures 143, 144 are disposed between the top surface 171 and the side surface 172 of the encapsulated light detector 17. In one or more embodiments, the guiding structures 141, 142 on the encapsulated light source 16 are omitted. In one or more embodiments, the guiding structures 143, 144 on the encapsulated light detector 17 are omitted. In an embodiment, the guiding structures 141, 142, 143, 144 are chamferings.

The cutting device (FIGS. 5 and 6) leaves a gap G1 between the encapsulated light source 16 and the encapsulated light detector 17 in an optical pair 33. Using the techniques described with respect to FIGS. 3-6, the gap G1 may be minimized to about 0.05 mm to about 0.5 mm. By way of comparison, if a mold were to be used to separately encapsulate the light source 12 and the light detector 13, due to structural and process factors, such a small gap G1 between the encapsulated light source 16 and the encapsulated light detector 17 would not be achieved Therefore, using the manufacturing techniques of the present disclosure, dimensions of the optical module can be decreased.

Figure 7:
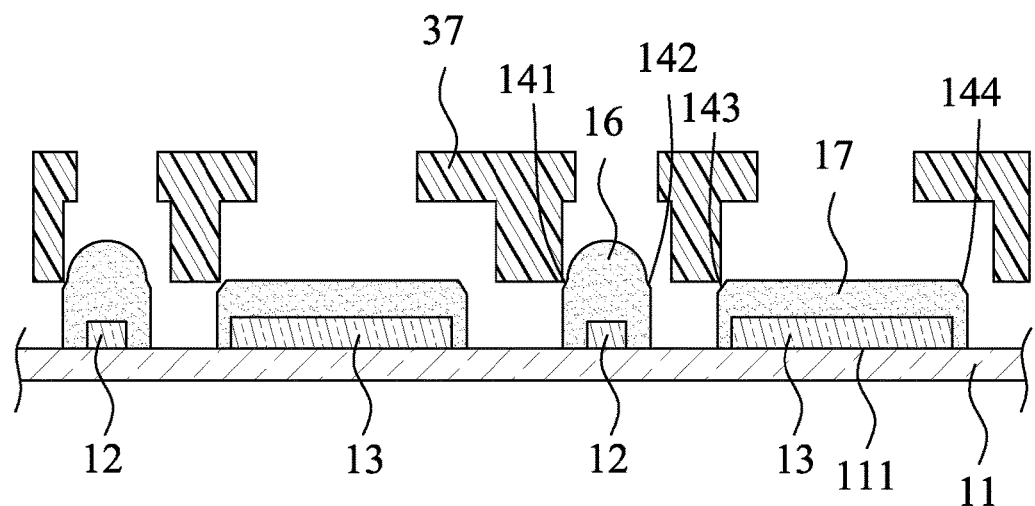
Figure 8:
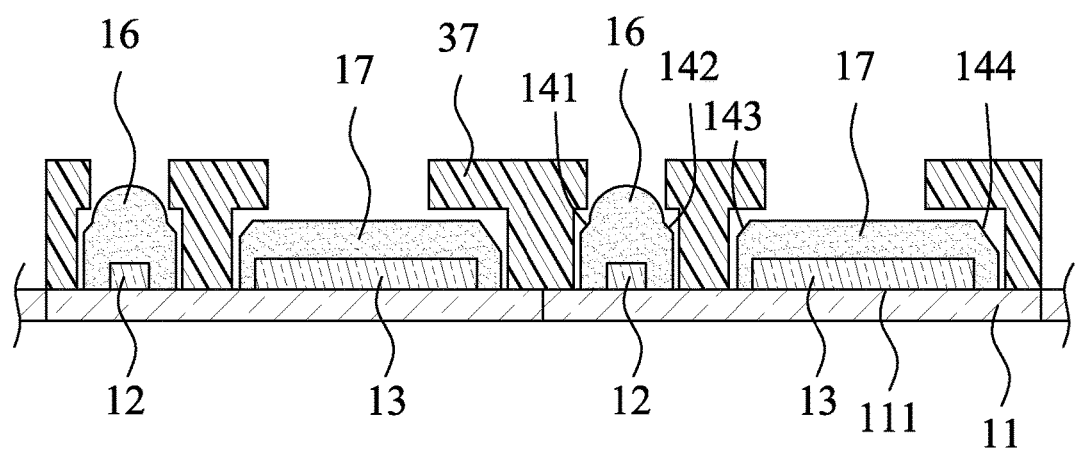

Referring to FIG. 7 and FIG. 8, a lid assembly 37 is disposed on the surface 111 of the carrier 11. If alignment errors occur during disposing the lid assembly 37, the lid assembly 37 may shift a distance from the intended placement path. For example, the lid assembly 37 may shift to the right and touch the guiding structures 141, 143 (as illustrated in FIG. 7), or shift to the left and touch the guiding structures 142, 144, where "left" and "right" are relative to the orientation illustrated in FIG. 7. Because the guiding structures 141, 142, 143, 144 are sloped surfaces in the embodiment illustrated in FIG. 7, the lid assembly 37 can follow the guiding structures 141, 143 or 142, 144 during placement, for improved alignment with reduced risk of damage during assembly.

The lid assembly 37 and the carrier 11 are cut (not shown) between the optical pairs 33, to form a plurality of optical modules such as the optical module 10 shown in FIG. 1.

In one or more embodiments, rather than a single lid assembly 37 being disposed on the carrier 11 (e.g., FIGS. 7 and 8), individual lids are disposed on the carrier 11 over respective optical pairs 33, and then the carrier 11 is cut to form multiple optical modules 10.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For another example, "substantially orthogonal" can refer to a range of variation of less than or equal to ±10% of 90°, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

The term "substantially parallel" with respect to two surfaces can refer to each surface lying along a plane, with an angle between the planes being less than or equal to 10 degrees (10°).

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

What is claimed is:

1. An optical module, comprising:
    a carrier;
    a light source disposed adjacent to a surface of the carrier;
    a light detector disposed adjacent to the surface of the carrier; and
    a molding compound encapsulating the light source and the light detector, and including at least one sloped structure, the at least one sloped structure comprising a sloped surface extended between a side surface and a top surface of the molding compound; and
    a lid disposed between the light source and the light detector, and surrounding the light source and the light detector.

2. The optical module of claim 1, wherein the light source and a portion of the molding compound surrounding the light source form an encapsulated light source, and wherein the encapsulated light source comprises a top surface and a side surface, and a roughness of the top surface of the encapsulated light source is different from a roughness of the side surface of the encapsulated light source.

3. The optical module of claim 2, wherein the side surface of the encapsulated light source is a cut side of the encapsulated light source.

4. The optical module of claim 1, wherein the light detector and a portion of the molding compound surrounding the light detector form an encapsulated light detector, wherein the encapsulated light detector comprises a top surface and a side surface, and a roughness of the top surface of the encapsulated light detector is different from a roughness of the side surface of the encapsulated light detector; and wherein the at least one sloped structure is disposed between the top surface and the side surface of the encapsulated light detector.

5. The optical module of claim 4, wherein the top surface of the encapsulated light detector is substantially horizontal, and the top surface and the side surface of the encapsulated light detector are substantially orthogonal.

6. The optical module of claim 1, wherein the molding compound exposes a portion of the surface of the carrier between the light source and the light detector, the light source and a portion of the molding compound surrounding the light source form an encapsulated light source, and the light detector and a portion of the molding compound surrounding the light detector form an encapsulated light detector; and wherein a gap dimension at the surface of the carrier between the encapsulated light source and the encapsulated light detector is about 0.05 mm to about 0.5 mm.

7. The optical module of claim 1, wherein the light detector and a portion of the molding compound surrounding the light detector form an encapsulated light detector, and the at least one sloped structure is one sloped structure disposed on the encapsulated light detector.

8. The optical module of claim 1, wherein the at least one sloped structure is at least one chamfering.

9. The optical module of claim 1, wherein the at least one sloped structure is arcuate.

10. A process of manufacturing an optical module, comprising:
   providing a carrier;
   disposing at least one light source and at least one light detector adjacent to a surface of the carrier;
   encapsulating the light source and the light detector by an encapsulant to form an encapsulated light source, and forming at least one sloped structure between a side surface and a top surface of the encapsulant, the at least one sloped structure comprising a sloped surface extended between a side surface and a top surface of the encapsulant; and
   applying a lid surrounding the light source and the light detector, wherein a portion of the lid is positioned between the light source and the light detector.

11. The process of claim 10, further comprising forming a gap in the encapsulant between the light source and the light detector.

12. The process of claim 11, further comprising cutting the encapsulant to form the gap and expose the carrier between the light source and the light detector.

13. The process of claim 12, wherein the encapsulant and the light source together form an encapsulated light source, and the encapsulant and the light detector together form an encapsulated light detector spaced apart from the encapsulated light source by the gap, the at least one sloped structure includes a plurality of sloped structures, and wherein the sloped structures are disposed on the encapsulated light source and the encapsulated light detector.

14. The process of claim 12, wherein the encapsulant and the light detector together form an encapsulated light detector, and the at least one sloped structure is disposed between a top surface and a side surface of the encapsulated light detector.

15. The process of claim 10, wherein a light source and an adjacent light detector are an optical pair, there is a connecting portion of the carrier between two adjacent optical pairs, and the encapsulant is disposed on the connecting portion.

16. The process of claim 15, further comprising cutting the encapsulant on the connecting portion.

17. The process of claim 10, wherein a light source and an adjacent light detector are an optical pair, further comprising disposing a lid assembly on the surface of the carrier, and cutting the lid assembly and the carrier, to singulate a plurality of optical pairs.

18. The process of claim 10, wherein a light source and an adjacent light detector are formed as an optical pair, further comprising disposing a plurality of lids on the surface of the carrier, and cutting the carrier to singulate a plurality of optical pairs.

19. The process of claim 10, wherein the at least one sloped structure is formed by a mold.

20. The process of claim 10, wherein the at least one sloped structure is at least one chamfering.

21. The optical module of claim 1, wherein the at least one sloped structure is positioned below the lid.

22. The process of claim 10, wherein the encapsulated light source comprises a lens structure, and the lens structure is integral with the encapsulant.

* * * * *